March 19, 1935.  C. LANGUM  1,994,859
FLY POISONING DEVICE
Filed March 27, 1933
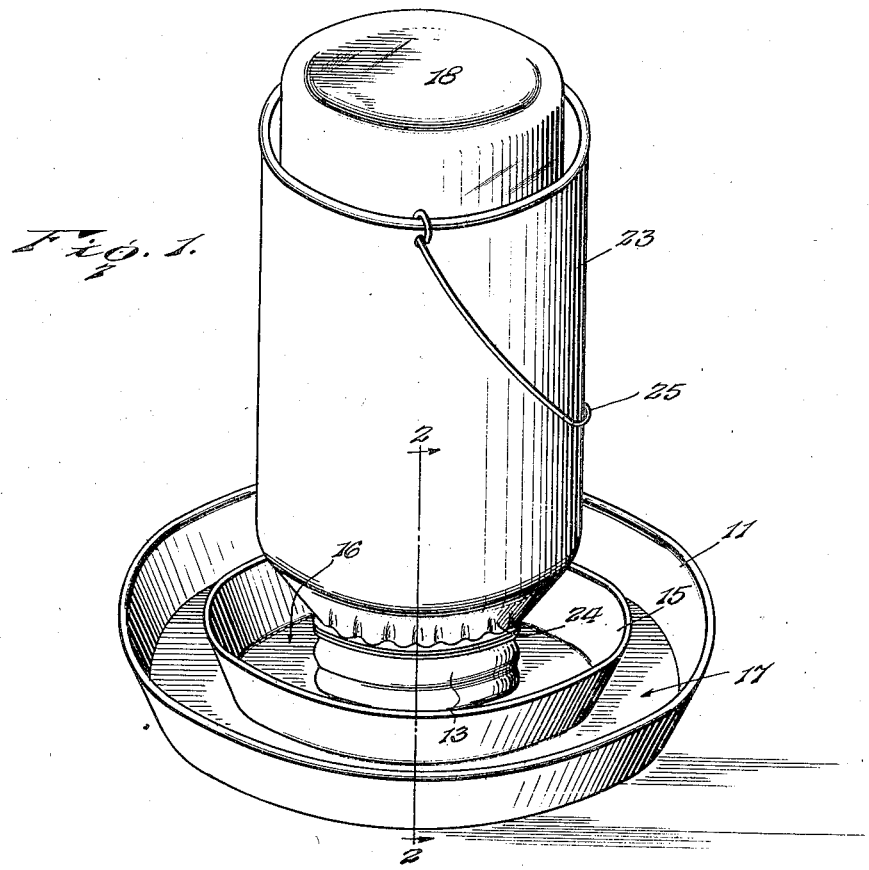
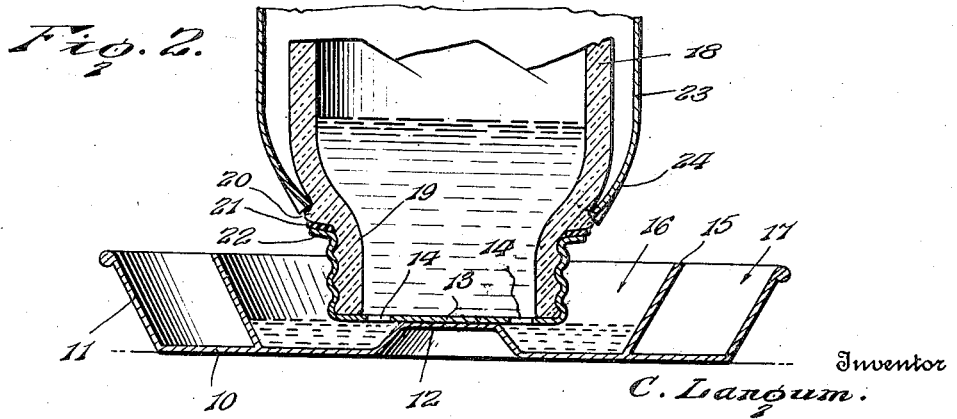

UNITED STATES PATENT OFFICE 1,994,859

FLY-POISONING DEVICE

Conrad Langum, Volga, S. Dak.

Application March 27, 1933, Serial No. 663,066

2 Claims. (Cl. 43—131)

This invention relates to an improved fly-poisoning device and seeks, among other objects, to provide a device of this character embodying a fountain adapted to contain sufficient liquid poison to last over a considerable period of time so that the device may be filled with the poison and suspended in a room, barn, shed or the like for poisoning the flies frequenting such places.

The invention seeks, as a further object, to provide a device embodying a drinking pan and a liquid container connected in inverted position with the pan in such a way that the liquid poison will flow out of the container into the pan to always stand at a relatively constant level therein.

A further object of the invention is to provide a pan embodying a poison basin and a surrounding bait basin adapted to contain a bait for attracting the flies to the poison.

And the invention seeks, as a still further object, to provide improved means for suspending the liquid container and pan and wherein said suspension means will embody a protecting shell for the container.

With the foregoing and other objects in view, the invention consists in certain novel details of construction and combinations of parts hereinafter fully described and specifically claimed.

In the accompanying drawing forming part of this specification, Figure 1 is a perspective view of my improved poisoning device, and Figure 2 is a fragmentary vertical sectional view more particularly showing the mounting of the liquid container.

In carrying the invention into effect, I provide a flat pan 10 having an upwardly and outwardly inclined rim 11 while at the center of the pan the bottom wall thereof is, as shown in Fig. 2, pressed upwardly to provide a raised seat 12 of frusto-conical outline. Soldered or otherwise rigidly fixed to said seat is an inverted cap 13 disposed axially of the pan and formed through the bottom wall of said cap outwardly from the seat are one or more spaced openings 14.

Fixed to the bottom wall of the pan, in concentric relation to the rim 11 thereof, is an upwardly and outwardly inclined partition 15 terminating flush with said rim. A poison basin 16 is thus defined about the cap 13 while an annular bait basin 17 is provided between the rim and partition to surround the poison basin.

Removably screwed into the cap 13 is a liquid poison container 18 which may be an ordinary Mason jar. As is customary, the jar is contracted to provide a neck 19 externally threaded to receive the cap 13 while, at the base of the neck, is provided an external bead 20. This bead defines an annular shoulder about the neck upon which is seated a gasket 21, and formed on the side wall of the cap 13 is an out-turned flange 22 seating against said gasket so that a sealed joint is thus provided between the cap and the container.

Loosely surrounding the container 18 is a protecting shell 23 which is preferably of resilient sheet metal and serves as a guard to prevent accidental fracture of the container. The shell is somewhat shorter than the container but is of considerably greater diameter and at its lower end the shell is bent or crimped inwardly to provide an annular flange 24 snugly fitting about the contracted portion of the container immediately above the bead 20. The flange will thus serve to center the shell with respect to the container and, when the device is not suspended, will engage the bead 20 for limiting downward movement on the container. Swingingly connected to the upper margin of the shell, at diametric points thereon, is a bail 25.

In use, the shell 23 is slipped over the neck of the container 18 to engage therewith above the bead 20, the crimped flange 24 being adapted to spring over said bead and more or less snugly grip the container. The container is then filled with a suitable poisonous liquid and is screwed into the cap 13. Thus, liquid from the container will flow through the openings 14 in the cap into the poison basin 16 of the pan 10 until the liquid in said basin covers said openings, at which time the discharge of liquid from the container will be cut off, the construction being such, as will be at once appreciated, that the level of the liquid in the chamber 16 will be maintained relatively constant. A suitable bait for attracting flies is then placed in the basin 17, whereupon the device may be hung up or suspended by the bail 25. Thus, flies will be attracted to the poison in the chamber 16 by the bait in the chamber 17 and experience has shown the device to be highly effective in practical use.

Having thus described the invention, I claim:

1. A fly-poisoning device including a poison container provided with an outlet at its lower end, said container being contracted at its lower end, and a cylindrical shell having a contracted resilient lower end gripping the container around the contracted portion thereof and supporting the shell in spaced relation to the container to form a shield therefor.

2. A fly-poisoning device including a poison container provided with a contracted lower discharge end and having an annular bead on the contracted portion above the lower extremity thereof, and a cylindrical shell contracted at its lower end and crimped to provide a resilient flange gripping the contracted portion of the container immediately adjacent the bead, the shell surrounding the container in spaced relation thereto to constitute a shield therefor.

CONRAD LANGUM. [L. S.]